US009249617B2

(12) United States Patent
Bosserdet, Jr. et al.

(10) Patent No.: US 9,249,617 B2
(45) Date of Patent: Feb. 2, 2016

(54) ANIMAL DOOR HAVING AN ADJUSTABLE RESISTANCE AGAINST BEING OPENED

(75) Inventors: James R. Bosserdet, Jr., Old Fort, TN (US); Thomas P. Bjorholm, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 1674 days.

(21) Appl. No.: 12/208,645

(22) Filed: Sep. 11, 2008

(65) Prior Publication Data

US 2009/0255481 A1 Oct. 15, 2009

Related U.S. Application Data

(60) Provisional application No. 61/043,623, filed on Apr. 9, 2008.

(51) Int. Cl.
*A01K 1/035* (2006.01)
*E06B 7/32* (2006.01)

(52) U.S. Cl.
CPC .................................... *E06B 7/32* (2013.01)

(58) Field of Classification Search
CPC .................................. E06B 7/32; A01K 1/035
USPC ............ 119/481, 482, 484, 494, 501; 49/381, 49/169; 160/180
See application file for complete search history.

(56) References Cited

U.S. PATENT DOCUMENTS

| | | | | |
|---|---|---|---|---|
| 3,690,299 | A * | 9/1972 | Johnson | 119/174 |
| 3,797,554 | A * | 3/1974 | Johnson | 160/354 |
| 4,022,263 | A * | 5/1977 | Beckett et al. | 160/92 |
| 4,047,331 | A * | 9/1977 | Davlantes | 49/171 |
| 4,216,743 | A * | 8/1980 | Cohen | 119/484 |
| 4,760,872 | A * | 8/1988 | Hale, Jr. | 160/90 |
| 6,668,487 | B2 * | 12/2003 | Vesey | 49/169 |
| 7,814,956 | B2 * | 10/2010 | Lethers et al. | 160/184 |
| 7,913,454 | B2 * | 3/2011 | Sullivan | 49/169 |
| 2003/0221631 | A1 * | 12/2003 | Yarbrough | 119/484 |
| 2005/0284401 | A1 * | 12/2005 | Dawes | 119/484 |
| 2006/0101738 | A1 | 5/2006 | Lethers et al. | |
| 2007/0000449 | A1 * | 1/2007 | Martin | 119/484 |
| 2007/0051317 | A1 * | 3/2007 | Bruner | 119/53 |
| 2007/0089684 | A1 * | 4/2007 | Brooks et al. | 119/484 |
| 2008/0072843 | A1 * | 3/2008 | Malacarne et al. | 119/719 |
| 2008/0184625 | A1 * | 8/2008 | Bjorholm et al. | 49/371 |

OTHER PUBLICATIONS

Staywell 700 Original Pet Doors. [Online] Nov. 7, 2008. URL <http://www.petdoors.com/staywell_700_oriqinal.htm>.

(Continued)

*Primary Examiner* — Rob Swiatek
*Assistant Examiner* — Ebony Evans
(74) *Attorney, Agent, or Firm* — Pitts & Lake, P.C.

(57) ABSTRACT

Described is an animal door that is movable between a closed position and an open position and that has an adjustable resistance against the door being removed from the closed position to the open position. More specifically, the animal door defines a passageway and includes a flap that is moveable between the closed position and the open position, whereby the flap obstructs the passageway when at the closed position. The animal door generates a magnetic force that generates a resistance against the flap being moved from the closed position to the open position, whereby magnitude of the magnetic force, and thus the resistance, is adjustable.

14 Claims, 4 Drawing Sheets

(56) References Cited

OTHER PUBLICATIONS

PetSafe Classic Pet Doors. [Online] Nov. 7, 2008. URL <http://www.petdoors.com/petsafe_classic.htm>.

Ideal Pet—Original Dog Door. [Online] Nov. 7, 2008. URL <http://idealpetproduct.com/shop/item.asp?itemid=3>.

Petsafe Security Deadbolt Dog Doors. [Online] Nov. 7, 2008. URL <http://www.mightypets.com/product.asp?3=2299>.

Security Dead-bolt Pet Door—Owner's Manual. [Online] Nov. 7, 2008. URL <http://www.mightypets.com/Petsafe/Security-Deadbolt-Door.pdf>.

European Patent Office, Extended European Search report for App'l: EP09731369.

* cited by examiner

ANIMAL DOOR HAVING AN ADJUSTABLE RESISTANCE AGAINST BEING OPENED

CROSS-REFERENCE TO RELATED APPLICATIONS

This application claims the benefit of U.S. Provisional Application No. 61/043,623, filed Apr. 9, 2008.

STATEMENT REGARDING FEDERALLY SPONSORED RESEARCH OR DEVELOPMENT

Not Applicable

BACKGROUND OF THE INVENTION

This invention pertains to a device for providing an animal a passageway through a structure and for preventing environmental elements from passing through the passageway.

BRIEF SUMMARY OF THE INVENTION

In accordance with the various features of the present invention there is provided an animal door that is movable between a closed position and an open position and that has an adjustable resistance against the door being moved from the closed position to the open position. The animal door includes a frame, a flap, and one or more magnets. The frame is adapted to be installed at a through-opening defined by a structure, such as a wall or door. The frame defines a passageway that provides a passage through the through-opening and thus the structure. The flap is secured to the frame at the passageway and is movable between the closed position and the open position. When at the closed position, the flap obstructs the passageway such that environmental elements, such as unconditioned air, moisture, and debris, cannot pass through the passageway. The magnets are removably disposed at the frame and/or the flap such that the magnetic force generated by the magnets generates a resistance against the flap being moved from the closed position. Because the magnets are removable, the number of employed magnets, and thus the magnitude of the collective magnetic force, can be adjusted to the extent that the resistance against moving the flap from the closed position is adjustable.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
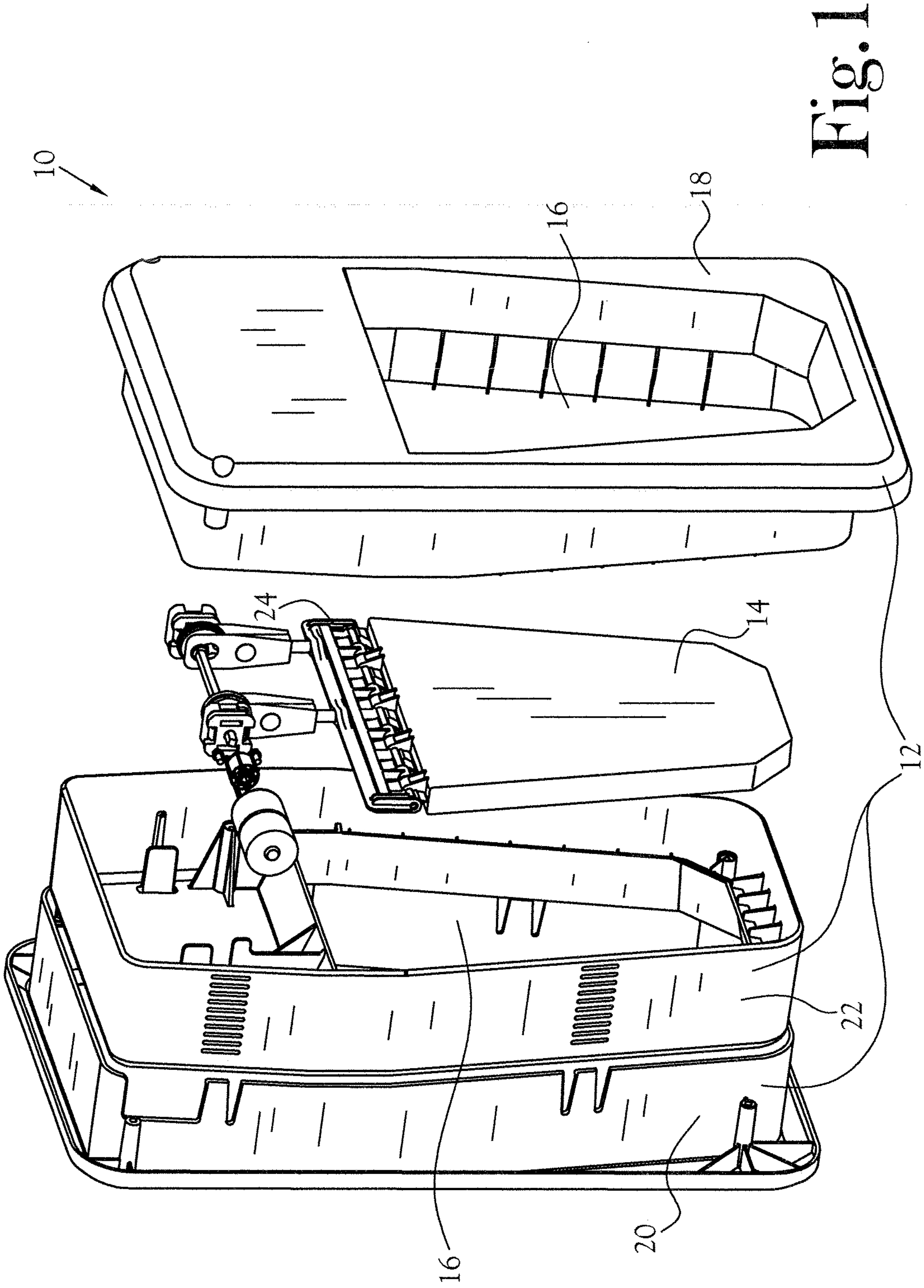
FIG. 1 is an exploded view of one embodiment of the animal door in accordance with the various features of the present invention.

The present invention provides an animal door that is movable between a closed position and an open position and that has an adjustable resistance against the door being moved from the closed position to the open position. More specifically, the animal door defines a passageway and includes a flap that is moveable between the closed position and the open position, whereby the flap obstructs the passageway when at the closed position. The animal door generates a magnetic force that generates a resistance against the flap being moved from the closed position to the open position, whereby the magnetic force, and thus the resistance, is adjustable. One embodiment of the animal door constructed in accordance with the various features of the present invention is illustrated generally at 10 in FIG. 1.

The animal door 10 includes a frame 12 and a flap 14. The frame 12 defines a passageway 16 and is adapted to be installed at a through-opening defined by a structure. The structure includes a wall or a door, such as a garage door or a conventional door, and the through-opening has a size and contour that is greater than that of the passageway 16. The frame 12 is installed at the through-opening such that the passageway 16 provides a passage through the structure. In at least one embodiment, the passageway 16 is sufficiently large to the extent that an animal can pass through it and thus pass through the structure. In the illustrated embodiment, the frame 14 includes a first frame member 18 and a second frame member 20, whereby the first frame member 18 cooperates with the second frame member 20 at the through-opening such that, in accordance with the above discussion, when the frame 12 is installed, the passageway 16 provides a passage through the structure. Additionally, in the illustrated embodiment, the frame 12 includes an adjustable frame member 22 disposed between and cooperating with the first frame member 18 and the second frame member 20. The adjustable frame member 22 cooperates with the first and second frame members 18, 20 such that the depth of the frame 12 is adjustable, that is, capable of being installed at various structures having various depths. It should be noted that the animal door 10 can have a frame 12 other than that of the illustrated embodiment without departing from the scope or spirit of the present invention.

Figure 2:
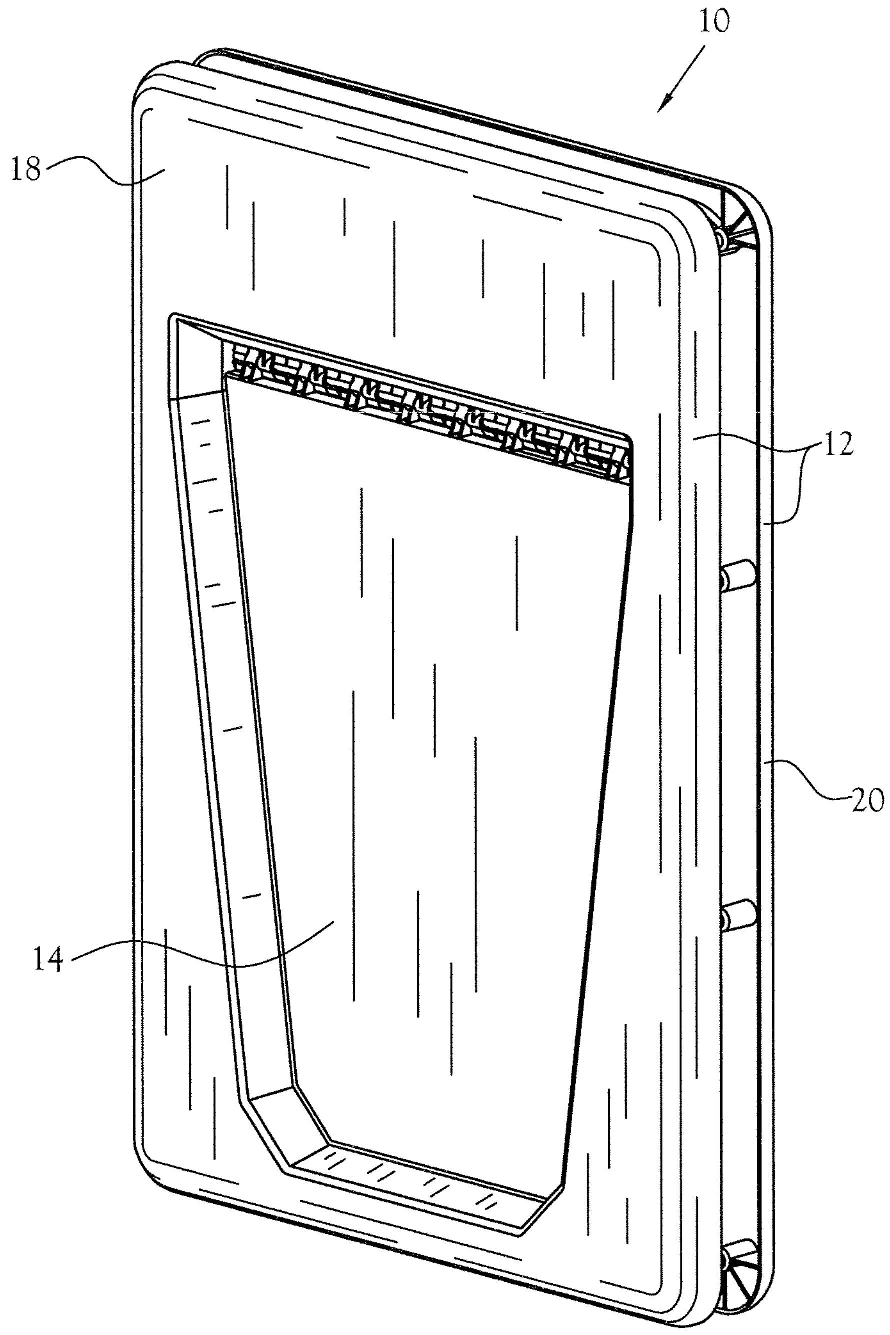
FIG. 2 illustrates the animal door of FIG. 1 being at the closed position.
Figure 3:
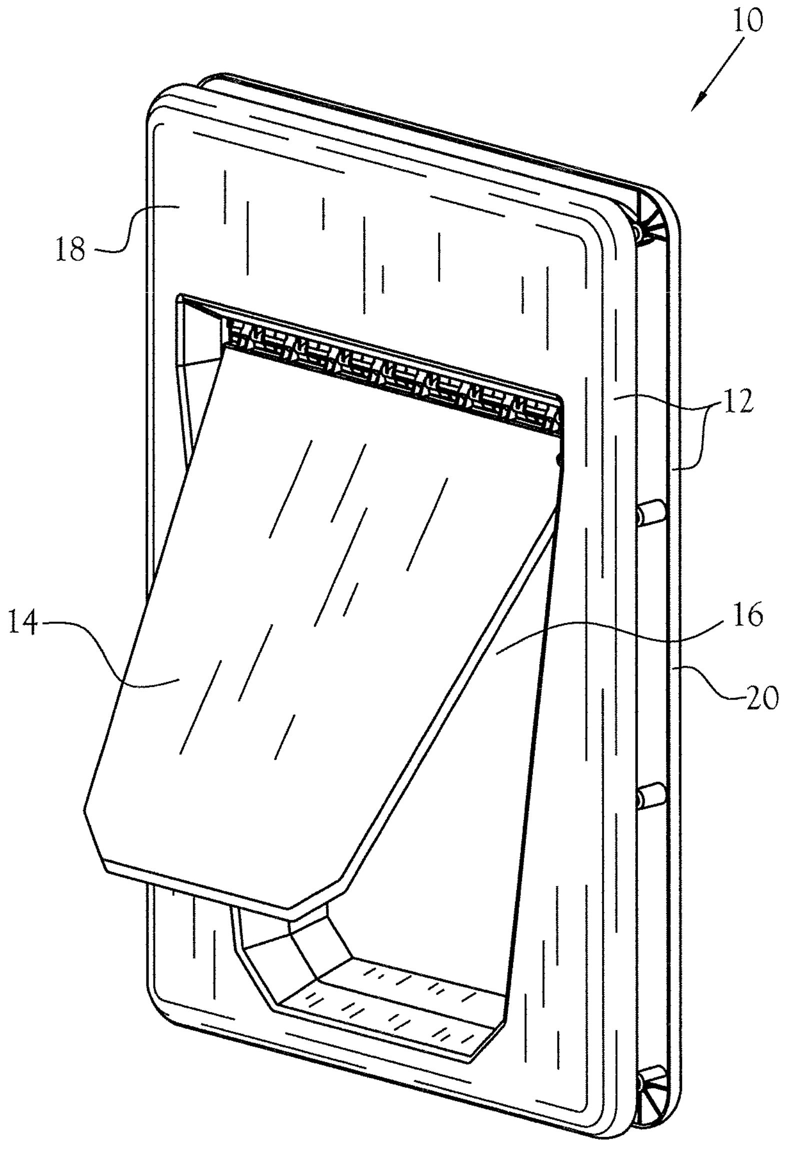
FIG. 3 illustrated the animal door of FIG. 1 being at the open position.

The flap 14 is mechanically engaged with the frame 12 at the passageway 16 such that the flap 14 is movable between a closed position and an open position. FIG. 2 illustrates one embodiment of the animal door 10 having the flap 14 at the closed position, and FIG. 3 illustrates one embodiment of the animal door 10 having the flap 14 at the open position. When at the closed position, the flap 14 maximally obstructs the passageway 16. For example, in one embodiment, when at the closed position, the flap 14 generates a weather resistant seal with the frame 12 such that environmental elements, including unconditioned air, moisture, and various debris, do not pass through the passageway 16. When at the open position, the flap 14 does not maximally obstruct the passageway 16 such that the animal and/or environmental elements can pass though the passageway 16. In the illustrated embodiment, the flap 14 is substantially rigid and mechanically engaged with the frame 12 by way of a bidirectional hinge member 24. The hinge member 24 permits the flap 14 to pivot between the closed position and the open position. It should be noted that the flap 14 need not be rigid or mechanically engaged with the frame 12 by way of the hinge member 24 to remain within the scope or spirit of the present invention. For example, the flap 14 can be constructed of a mechanically compliant material and immovably secured to the frame 12 such that the flap 14 flexes between the closed and open position.

The flap 14 is biased to the closed position. For example, in the illustrated embodiment, gravity biases the flap 14 to the closed position. However, it should be noted that the flap 14 can be biased to the closed position by a force other than gravity, such as that provided by a mechanical spring, without departing from the scope or spirit of the present invention. When at the closed position, the flap 14 is moved to the open position by a perpendicular force applied to a face surface of the flap 14. In the illustrated embodiment, because the flap 14 is mechanically engaged with the frame 12 by way of the bidirectional hinge member 24, the flap 14 can be moved from the closed position by a perpendicular force applied to either face surface. Considering the above discussion, an animal is able to apply a perpendicular force to the flap 14, move the flap 14 from the closed position, and gain access to the passageway 16. As a result, when the animal door 10 is installed at an exterior wall or door of, for example, a residential house, the animal door 10 provides the animal ingress and egress to the house. More specifically, when no force is being applied to the flap 14, the flap 14 remains at the closed position, preventing environmental elements from entering, for example, the house. However, when the animal pushes against a face surface of the flap 14, the flap 14 is moved to the open position, providing the animal access to the passageway 16 and consequently, for example, the house.

Figure 4:
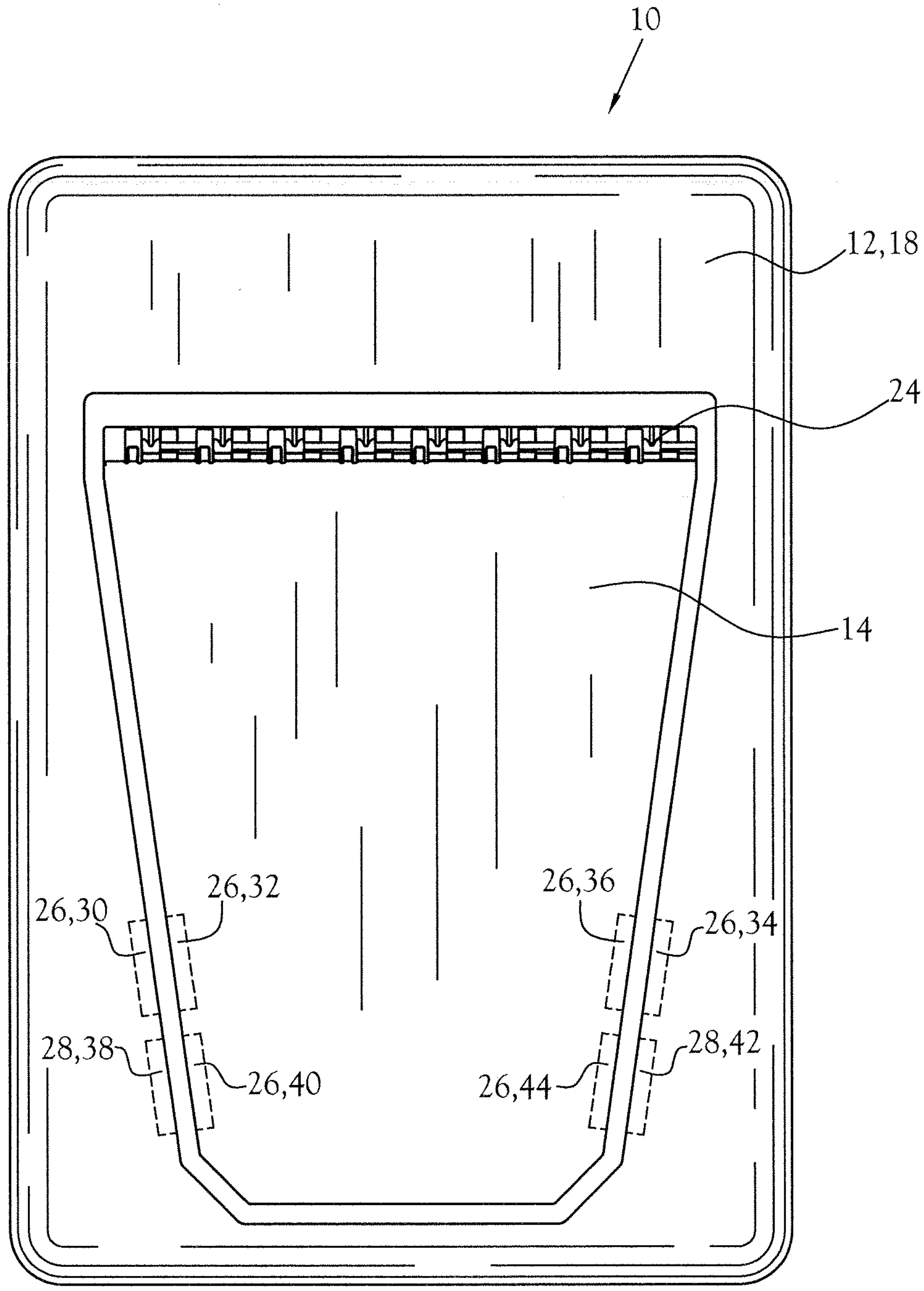
FIG. 4 illustrates the disposition of magnets in one embodiment of the animal door.

FIG. 4 is an elevated view of the animal door 10 of FIG. 1. The animal door 10 includes at least one magnet 26. The magnets 26 generate a magnetic force that generates a resistance against the flap 14 being moved from the closed position to the open position. More specifically, each magnet 26 is disposed at the flap 14, proximate the perimeter thereof, and/or the frame 12, proximate the passageway 16. Each magnet 26 generates a magnetic force drawing the magnet 26 toward a corresponding metallic member 28 or an additional magnet 26 disposed at the opposite member of the animal door 10 such that the generated magnetic force must be overcome to move the flap 14 from the closed position. Accordingly, the magnitude of the collective generated magnetic force governs the magnitude of the resistance against the flap 14 being moved from the closed position. So that the resistance is adjustable, at least one of the magnets 26 and/or metallic members 28 is removably disposed. Accordingly, removing a magnet 26 from the animal door 10 reduces the collective magnetic force generated by the magnets 26 and thus reduces the resistance against the flap 14 being moved from the closed position. Similarly, removing a metallic member 28 that is magnetically coupled with a magnet 26 reduces the collective magnetic force generated by the magnets 26 and thus reduces the resistance against the flap 14 being moved from the closed position. It should also be noted that coupling a magnet 26 with another magnet 26 such that the generated magnetic force draws the magnets toward one another generates a greater magnetic force than coupling a magnet 26 with a metallic member 28.

In furtherance of the discussion of the various features of the animal door 10, FIG. 4 illustrates one embodiment of the animal door 10 having four removable magnets 26 and two metallic members 28. More specifically, a first magnet 30 is disposed at the frame 12 proximate the passageway 16, and a second magnet 32 is removably disposed at the perimeter of the flap 14 and opposite the first magnet 30 such that when the flap 14 is at the closed position, the first magnet 30 and the second magnet 32 generate a magnetic force drawing the magnets toward one another. Similarly, a third magnet 34 is disposed at the frame 12 proximate the passageway 16, and a fourth magnet 36 is removably disposed at the perimeter of the flap 14 and opposite the third magnet 34 such that when the flap 14 is at the closed position, the third magnet 34 and the fourth magnet 36 generate a magnetic force drawing the magnets toward one another. Additionally, the first and second magnets 30, 32 are disposed opposite the third and fourth magnets 34, 36 with respect to the passageway 16 and the flap 14, respectively, such that the collective generated magnetic force is optimized for generating the resistance against the flap 14 being moved from the closed position. A first metallic member 38 is disposed at the frame 12 proximate the passageway 16, and a fifth magnet 40 is removably disposed at the perimeter of the flap 14 and opposite the first metallic member 38 such that when the flap 14 is at the closed position, the fifth magnet 40 generates a magnetic force drawing the fifth magnet 40 and the first metallic member 38 toward one another. Similarly, a second metallic member 42 is disposed at the frame 12 proximate the passageway 16, and a sixth magnet 44 is removably disposed at the perimeter of the flap 14 and opposite the second metallic member 42 such that when the flap 14 is at the closed position, the sixth magnet 44 generates a magnetic force drawing the sixth magnet 44 and the second metallic member 42 toward one another. Additionally, the first metallic member 38 and the fifth magnet 40 are disposed opposite the second metallic member 42 and the sixth magnetic 44 with respect to the passageway 16 and the flap 14, respectively, such that the collective generated magnetic force is optimized for generating the resistance against the flap 14 being moved from the closed position.

As discussed above, the resistance against the flap 14 being moved from the closed position is adjustable because at least one of the magnets 26 and the metallic members 28 are removable. As an example, the animal door 10 of the illustrated embodiment is capable of a first configuration, a second configuration, and a third configuration, the first configuration generating a greater resistance than the second configuration, which generates a greater resistance than the third configuration. When the animal door 10 is in the first configuration, all of the magnets 26 and the metallic members 28 are employed. Consequently, the maximum collective magnetic force is generated, thus the maximum resistance against the flap 14 being moved from the closed position is generated. When the animal door 10 is in the second configuration, only the first, second, third, and fourth magnets 30, 32, 34, 36 are employed, thus reducing the collective magnetic force by approximately 33% (assuming the magnets 26 generate magnetic forces having the same magnitude) and reducing the resistance against the flap 14 being moved from the closed position. Additionally, when the animal door 10 is in the third configuration, only the fifth and sixth magnets 40, 44 and the first and second metallic members 38, 42 are employed, further reducing the collective magnetic force by 50% and further reducing the resistance against the flap 14 being moved from the closed position.

Although a specific embodiment of the animal door 10 is discussed above, it should be noted that the animal door 10 can vary from the above-discussed embodiment without departing from the scope or spirit of the present invention. For example, the number and respective positions of the magnets 26 can vary without departing from the scope or spirit of the present invention. Additionally, not all of the magnets 26 need to be removable for the animal door 10 to remain within the scope and spirit of the present invention. Further, the metallic members 28 can be removable such that none of the magnets 26 are removable without departing from the scope or spirit of the present invention. Additionally, the specific configurations that the animal door 10 are capable of and number thereof can vary without departing from the scope or spirit of the present invention.

Considering the above discussion, the collective magnetic force generated by the magnets 26 maintains the flap 14 at the closed position until a perpendicular force sufficient to overcome the magnetic force is applied to the flap 14. Consequently, for the animal to access the passageway 16, the animal must push against the flap 14 with a force sufficient to overcome the collective magnetic force. Additionally, because the animal door 10 provides an adjustable resistance against the flap 14 being moved from the closed position, a user of the animal door can employ the most effective resistance in view of factors such as the respective sizes of the various animals using the animal door 10 and current environmental conditions. For example, in one circumstance, the animal door 10 of the illustrated embodiment is employed in a windy environment and is used by a large animal and a small animal. When the animal door 10 is in the first configuration, the magnets 26 generate a resistance that is sufficient to prevent the wind from blowing the flap 14 from the closed position, that is sufficiently weak such that the large animal is able to overcome the resistance and move the flap 14 from the closed position, but that is great to the extent that the small animal is unable to overcome the resistance and move the flap 14 from the closed position. When the animal door 10 is in the third configuration, the magnets 26 generate a resistance that is sufficiently weak such that the small animal is able to overcome the resistance and move the flap 14 from the closed position but that is too weak to prevent the wind from blowing the flap 14 from the closed position. However, when the animal door 10 is in the second configuration, the magnets 26 generate a resistance that is sufficient to prevent the wind from blowing the flap 14 from the closed position and that is sufficiently weak such that both the large animal and the small animal are able to overcome the resistance and move the flap 14 from the closed position. As a result, for the given circumstances, the user sets the animal door 10 to operate in the second configuration.

As another example, the animal door 10 of the illustrated embodiment is employed in the same windy environment discussed above but is used solely by the large animal. Additionally, the animal door 10 initially operates in the second configuration, but a small wild animal, such as a squirrel, begins moving the flap 14 from the closed position and accessing the passageway 16. To prevent the wild animal from accessing the passageway 16, the animal door 10 is adjusted to be in the first configuration. As a result, the magnets 26 generate a resistance that is sufficient to prevent the wind from blowing the flap 14 from the closed position, that is sufficiently weak such that the large animal is able to overcome the resistance and move the flap 14 from the closed position, and that is sufficiently great to the extent that the small wild animal is unable to overcome the resistance and move the flap 14 from the closed position. As a result, the user is able to adjust the resistance against the flap 14 being moved from the closed position to accommodate the current circumstances.

From the foregoing description, those skilled in the art will recognize that an animal door that is movable between a closed position and an open position offering advantages over the prior art has been provided. More specifically, the animal door defines a passageway and includes a flap that is moveable between the closed position and the open position, whereby the flap obstructs the passageway when at the closed position. The animal door generates a magnetic force that generates a resistance against the flap being moved from the closed position to the open position, whereby the magnitude of the magnetic force, and thus the resistance, is adjustable.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An animal door comprising:

a frame adapted to be installed at a through-opening defined by a structure, said frame defining a passageway at the through-opening;

a flap mechanically engaged with said frame, said flap being movable between a closed position and an open position;

at least one metallic member disposed at either said frame or said flap;

at least one magnet disposed at either said frame or said flap, said at least one magnet generating a magnetic force that draws at least one of said at least one magnet toward either another of said at least one magnet or at least one of said at least one metallic member, the magnetic force generating a resistance against moving said flap from the closed position; and at least one of said at least one metallic member and said at least one magnet being removably disposed proximate a perimeter of the flap on opposite sides of the through-opening, respectively, such that a magnitude of the collective magnetic force of the at least one magnet and the at least one metallic member creates an adjustable resistance against moving the flap from the closed position, the adjustable resistance having a first configuration corresponding to a minimum collective magnetic force and a second configuration corresponding to a maximum collective magnetic force based on the number of magnets and metallic members relatively disposed at the frame or flap, respectively.

2. An animal door comprising:

a frame defining a passageway at a through-opening defined by a structure;

a flap pivoting within said passageway between a closed position and an open position; and a plurality of magnetic couplers cooperating to produce a magnetic force drawing said flap to said closed position and resisting movement of said flap from said closed position, each said magnetic coupler comprising a first member and a cooperating second member, said first member being magnetically attracted to said second member, at least one of said first member and said second member being a magnet, said first member carried by said frame and said second member carried by said flap, at least one of said first member and said second member being selectively removably disposed proximate a perimeter of the flap on opposite sides of the through-opening, respectively, said magnetic couplers being variable in number or magnetic strength to selectively increase or decrease said magnetic force, said magnetic force determining the force that must be applied to said flap to move said flap from said closed position such that a magnitude of the collective magnetic force of the plurality of magnetic couplers creates an adjustable resistance against moving the flap from the closed position, the adjustable resistance having a first configuration corresponding to a minimum collective magnetic force and a second configuration corresponding to a maximum collective magnetic force based on the number of magnetic couplers relatively disposed at the frame or flap, respectively.

3. The animal door of claim 2 wherein the passageway is sufficiently large to the extent that the animal is able to pass through the passageway.

4. The animal door of claim 2 wherein said flap is mechanically engaged with said frame by way of a hinge member.

5. The animal door of claim 2 wherein said flap is substantially rigid.

6. The animal door of claim 2 wherein said flap is constructed of a flexible material.

7. The animal door of claim 2 wherein said flap and said frame cooperate to generate a weather resistant seal at the passageway when said flap is at the closed position.

8. The animal door of claim 2 wherein said first member and said second member are selected from the group consisting of magnets and metallic members.

9. The animal door of claim 2 wherein said magnetic force is determined by the number of said magnetic couplers having both a first member and a second member carried by said animal door.

10. The animal door of claim 2 wherein said magnetic force is determined by the strengths of said magnets in said magnetic couplers having both a first member and a second member carried by said animal door.

11. The animal door of claim 2 wherein said flap moves vertically within said frame between a locked position preventing movement of said flap and an unlocked position allowing said flap to move between the said closed position and said open position, said first member and said second member of each pair of magnetic couplers being substantially aligned with each other when said flap is in said unlocked position.

12. The animal door of claim 2 wherein said frame further comprises a plurality of receptacles disposed about the perimeter of said passageway for receiving a selected number of said first members.

13. The animal door of claim 2 wherein said flap further comprises a plurality of receptacles disposed about the perimeter of said flap for receiving a selected number of said second members.

14. The animal door of claim 2 wherein at least one of said first member and said second member are selectively installable.

* * * * *